3,534,000
HUMIDITY HARDENABLE POLYURETHANES AND COMPOSITIONS
Bernard Blanc and Gerard Repiquet, Martigues, and Camille Granger, Lavera, France, assignors to Naphtachimie, Paris, France
No Drawing. Filed Dec. 6, 1966, Ser. No. 599,357
Claims priority, application France, Dec. 17, 1965, 42,808
Int. Cl. C08g 22/14
U.S. Cl. 260—77.5                                   12 Claims

ABSTRACT OF THE DISCLOSURE

The invention comprises the preparation of polyurethanes which are hardenable by the humidity in the atmosphere and wherein the polyurethanes are formed by the reaction of a polyether pentol or a polyether hexol with an organic polyisocyanate in an inert organic solvent and in an inert dry atmosphere and in which the ratio of NCO groups in the polyisocyanate to the OH groups in the polyether polyol is within the range of 5.5 to 9.

---

This invention rates to polyurethanes which are hardenable by the humidity present in the air and which find use in the formulation of protective coatings in the form of paints, varnishes and coatings applied to such surfaces as wood, metal, cement, mortar and concrete for mechanical strength and chemical resistance.

Polyurethanes formulated of organic polyisocyanates and polyhydroxy compounds to contain free isocyanate groups and capable, in thin films, of hardening by crazing from the humidity in the air, are well known. Once crazed, such coatings are sensitive to the action of bases and are incapable of providing sufficient protection from attack by basic compositions.

Humidity hardenable polyurethanes formed by reaction of polyalkylene glycol with organic diisocyanates are also well known.

The ratio of diisocyanate to the amount required stoichiometrically to react with the hydroxyl groups of the polyalkylene glycol is within the range of 1.2 to 3.5 and preferably 1.5 to 2. Such reaction produces a coating that is flexible and chemically resistant but has insufficient hardness due possibly to the comparatively slight amount of crazing.

Other polyurethanes are known which make use of both a polyalkylene glycol and a saturated aliphatic diol and/or a saturated aliphatic triol as the polyhydroxyl compound, but such systems are generally complicated and produce coatings which are relatively only slightly crazed and soft.

It is an object of this invention to produce and to provide a method for producing polyurethanes which are hardenable by the humidity in the air and which can be formulated into a paint, varnish, or other coating composition capable of producing hard and chemically resistant coatings.

In accordance with the practice of this invention, a polyurethane of the type described is obtained by reacting a polyether pentol or a polyether hexol with an organic polyisocyanate in an inert organic solvent, in which the number of NCO groups in the polyisocyanate to the number of OH groups in the polyether polyol is within the range of 5.5 to 9.

As the polyether pentol, use can be made of the condensate of polypropylene oxide and xylitol in which the condensate has a molecular weight average within the average of 1700 to 7500.

As the polyether hexol, use can be made of the condensate of propylene oxide and sorbitol, with the condensate having a molecular weight average within the range of 2000 to 9000.

As the polyisocyanate, use can be made of the product of the reaction between an aliphatic polyol having at least three hydroxyl groups per molecule and about twice the stoichiometric amount of diisocyanate. As an example, advantageous use can be made of the reaction product of 1 mole trimethylol-1,1,1-propane with 3 moles toluene diisocyanate.

Representative of the inert organic solvent are a wide variety of organic solvents other than those containing a hydrogen group which may react with the isocyanate. For example, use can be made of toluene, ethyl acetate, butyl acetate, ethyl glycol acetate, methyl isobutyl ketone, or mixtures thereof.

It is desirable to make use of raw materials having a minimum amount of moisture to avoid unnecessary consumption of polyisocyanate and to avoid solidification of the product during preparation.

As a first step in the preparation of the product, the solvent is added to the polyether in an amount sufficient to maintain the desired fluidity in the mixture during reaction with the polyisocyanate.

By way of modification, other substances may be added to the polyether such as spreading agents, as illustrated by cellulose acetobutyrate, fillers such as talc, baryta, pigments and suitable coloring agents. In the event that such fillers are employed, it is desirable to include water-fixing agents such as activated alumina or otherwise remove free water.

As a next step, the polyisocyanate, with or without dilution in solvent, is added to the mixture containing the polyether. The operations are carried out with agitation in a dry inert atmosphere. The materials are then held at a temperature within the range of 10–80° C. At ambient temperature, about a week is required virtually to complete the reaction. At a temperature within the higher range of 60–80° C., the reaction will be virtually completed within a few hours. At intermediate temperatures, the time will range from the few hours at the higher temperature to days at the lower temperature.

The product resulting from the reaction should be stored in a dry water-tight container or package. Under these conditions, the product will have good shelf life and the viscosity and the isocyanate groups will remain substantially unchanged over a long period of time.

In formulation to produce a coating composition for application as a thin film, it is only necessary to add the requisite amount of solvent. Paints, varnishes and coating compositions can be formulated from the polyurethanes of this invention which, when applied in a thin film onto a surface in a humid atmosphere, will dry and harden within one hour. It is possible to reduce the hardening time by the use of certain catalysts, such as amine catalysts, as represented by dimethyl ethanolamine.

The following examples are given by way of illustration, but not by way of limitation, of the practice of this invention:

EXAMPLE 1

Preparation of a varnish 20.8 parts by weight of the condensate of propylene oxide and sorbitol having an average molecular weight of about 6400, 9.8 parts by weight of ethyl acetate, 17.5 parts by weight of toluene and 2.2 parts by weight of cellulose acetobutyrate in a 10% solution in ethyl glycol acetate are introduced with mixing in a receptacle maintained under an atmosphere of nitrogen. Addition is made of 49.7 parts by weight of a 75% by weight solution in ethyl acetate of the polyisocyanate which is obtained by reacting 3 moles of toluene diisocyanate with 1 mole of trimethanol-1,1,1-propane in which the solution has a free isocyanate value of about 13% by weight.

The ratio of polyisocyanate to the theoretical quantity required to react stoichiometrically with the hydroxyl groups of the polyether is 7.9.

The temperature is raised to 70° C. with continued agitation and while still maintaining the nitrogen atmosphere. Under these conditions, the reaction is completed in three hours.

The product obtained contains 5.2% by weight free isocyanate and has a viscosity of 20 poises at 25° C. These features remain stable, as evidenced by the fact that they have not appreciably varied over nine months storage in a dry water-tight package.

In the preparation of a varnish having a viscosity suitable for application with a brush, roller or spray gun, 70 parts by weight of an equal amount of toluene, ethyl acetate, butyl acetate and ethylene glycol acetate are added per 100 parts by weight of the product of Example 1.

Upon application in a thin film, the varnish dries in about one hour. It has a high degree of hardness which measures about 300 seconds with a Persoz pendulum according to norm AFNOR NFT 30.016. The varnish coat is highly resistant to chemical attack from the standpoint of acid, base or solvent resistance. It is particularly suitable for varnishing floors.

EXAMPLE 2

Preparation of a varnish

A varnish is prepared by the same method as in Example 1 from the following constituents:

| | Parts by weight |
|---|---|
| Addition product of propylene oxide and sorbitol, molecular weight 6400 | 25.2 |
| Ethyl acetate | 9.0 |
| Toluene | 18.2 |
| Cellulose acetobutyrate (10% by weight solution in ethyl glycol acetate) | 2.6 |
| Product of reaction between 3 molecules of toluene diisocyanate and 1 molecule of trimethylol-1,1,1-propane, in 75% by weight solution in ethyl acetate (solution contains about 13% by weight of free isocyanate) | 45.0 |

The ratio of the number of isocyanate groups in the polyisocyanate to the hydroxyl groups in the polyether is 5.9. The prepolymer thus obtained contains 4.2% by weight of free isocyanate groups and has a viscosity of 30 poises at 25° C.

To obtain a varnish ready for use, 170 parts by weight of the mixture of solvents described in Example 1 is added to 100 parts by weight of the above.

When applied in a thin film and exposed to air, the varnish will dry in about one hour. By the addition of dimethyl ethanolamine in an amount of about 0.15 part by weight per 100 parts by weight of the prepolymer, the drying time will be reduced to about 20 minutes.

The hardness of the dry film measures 230 seconds by the Persoz pendulum according to norm AFNOR NFT 30.016.

In addition to its hardness, the dried varnish coating has good flexibility which enables it to withstand the deformation of the backing to which it is applied.

EXAMPLE 3

Preparation of a paint

The following compounds are first ground in a ball mill:

| | Parts by weight |
|---|---|
| Additional product of propylene oxide and sorbitol of molecular weight 6400 with 0.1% by weight of water | 14.0 |
| Pure ethyl acetate | 6.6 |
| Pure toluene | 11.8 |
| Deep red titanium oxide with 0.7% by weight of water | 21.0 |
| Red azo coloring agent with 0.4% by weight of water | 1.0 |

6 parts by weight of powdered activated alumina is stirred into the mixture. The powder has the following characteristics:

Diameter of grains: 1 to 10 microns
Specific area: 341 m.$^2$/g.
Soda content: 1000 parts per million by weight 36.8 parts by weight of the reaction product in 75% by weight solution in ethyl acetate of 3 moles toluene diisocyanate and 1 mole trimethylol-1,1,1-propane (the solution having a free isocyanate value of about 13% by weight) and 2.2 parts by weight of a 10% by weight solution of cellulose acetobutyrate in ethyl glycol acetate are added to the mixture.

The mixture, in a nitrogen atomsphere, is agitated and the temperature is gradually raised to about 75° C. and held at that temperature for 3 hours.

The resulting product is a pigmented prepolymer which forms a single-package paint that is hardenable by the humidity in the air. The paint is unaffected by storage notwithstanding the presence of an azo coloring agent which ordinarily acts as a catalyst in the reactions of isocyanates on water.

When applied in a thin film, the paint will dry in about an hour. Its mechanical properties are excellent and it has a high degree of hardness of the order of 290 seconds, as measured by the Persoz pendulum.

It will be apparent from the foregoing that we have provided a new and improved polyurethane prepolymer which is hardenable by the humidity in the air in a short period of time to produce a hard, chemically resistant coating.

It will be understood that changes may be made in the details of materials and formulation and reaction conditions without departing from the spirit of the invention, especially as defined in the following claims.

We claim:
1. The method of preparing hard, chemically resistant polyurethanes which are hardenable by the humidity in the air comprising reacting a polyether polyol selected from the group consisting of polyether pentol and polyether hexol with an organic polyisocyanate in an inert organic solvent in which the ratio of NCO groups in the polyisocyanate to the OH groups in the polyether polyol is within the range of 5.5 to 9 in which the polyisocyanate consists essentially of the reaction product of an aliphatic polyol having at least three hydroxyl groups per molecule with at least twice the stoichiometric amount of organic diisocyanate.

2. The method as claimed in claim 1 in which the polyether polyol is a polyether pentol formed by the condensation of propylene oxide and xylitol and having an average molecular weight of 1700 to 7500.

3. The method as claimed in claim 1 in which the polyether polyol is a polyether hexol formed by the condensation of propylene oxide and sorbitol having a molecular weight average of from 2000 to 9000.

4. The method as claimed in claim 1 in which the polyisocyanate comprises the product of the reaction between 1 mole of trimethylol-1,1,1-propane and about 3 moles of toluene diisocyanate.

5. The method as claimed in claim 1 in which the reaction between the polyether and the polyisocyanate is carried out at a temperature within the range of 10–80° C. in a dry inert atmosphere.

6. The method as claimed in claim 1 in which the inert organic solvent is selected from the group consisting of toluene, ethyl acetate, butyl acetate, ethyl glycol acetate, methyl isobutyl ketone and mixtures thereof.

7. The method as claimed in claim 1 in which free water has been removed from the reactants.

8. The method as claimed in claim 1 which includes the addition of a spreading agent in the form of cellulose acetobutyrate.

9. The method as claimed in claim 1 which includes the addition of dry fillers.

10. The method as claimed in claim 1 in which the ingredients other than the polyisocyanate are combined before the addition of the polyisocyanate.

11. The method as claimed in claim 1 which includes the step of packaging the prepolymer in a sealed container.

12. A polyurethane which is hardenable by the humidity in the air prepared by the method of claim 1.

References Cited

UNITED STATES PATENTS

| | | |
|---|---|---|
| 3,042,666 | 7/1962 | Gentles. |
| 3,252,943 | 5/1966 | Dankert et al. |
| 2,929,800 | 3/1960 | Hill. |
| 2,901,467 | 8/1959 | Croco _____ 260—77.5 |

MORRIS LIEBMAN, Primary Examiner

U.S. Cl. X.R.

260—13, 37